(12) United States Patent
Zhang

(10) Patent No.: US 10,214,098 B2
(45) Date of Patent: Feb. 26, 2019

(54) CAP ASSEMBLY FOR A CARBON CANISTER FUEL TANK

(71) Applicant: CHONGQING BAIKE DINGYU TECHNOLOGY Co., Ltd., Chongqing (CN)

(72) Inventor: Yi Zhang, Chongqing (CN)

(73) Assignee: CHONGQING BAIKE DINGYU TECHNOLOGY Co., Ltd., Chongqing (CN)

(*) Notice: Subject to any disclaimer, the term of this patent is extended or adjusted under 35 U.S.C. 154(b) by 91 days.

(21) Appl. No.: 15/396,140

(22) Filed: Dec. 30, 2016

(65) Prior Publication Data
US 2018/0118019 A1  May 3, 2018

(30) Foreign Application Priority Data
Nov. 2, 2016 (CN) .......................... 2016 1 0948258

(51) Int. Cl.
| | |
|---|---|
| *B60K 15/00* | (2006.01) |
| *B60K 15/035* | (2006.01) |
| *B01D 53/04* | (2006.01) |
| *B60K 15/04* | (2006.01) |

(52) U.S. Cl.
CPC .... *B60K 15/03504* (2013.01); *B01D 53/0446* (2013.01); *B60K 15/0406* (2013.01); *B01D 2253/102* (2013.01); *B01D 2259/4516* (2013.01); *B60K 2015/03514* (2013.01); *B60K 2015/03547* (2013.01); *B60K 2015/03557* (2013.01); *B60K 2015/0438* (2013.01)

(58) Field of Classification Search
CPC .......... B60K 15/03504; B60K 15/0406; B60K 2015/03557; B01D 53/0446; B01D 2253/102; B01D 2259/4516
USPC ............................. 55/385.4, 49, 498; 96/113
See application file for complete search history.

(56) References Cited

U.S. PATENT DOCUMENTS

| | | | |
|---|---|---|---|
| 2011/0290118 A1* | 12/2011 | Tanaka | B60K 15/03504 96/139 |
| 2012/0055454 A1* | 3/2012 | Olateru | B60K 15/03519 123/572 |
| 2016/0243489 A1 | 8/2016 | Zhang | |
| 2016/0272064 A1 | 9/2016 | Zhang | |
| 2016/0273497 A1 | 9/2016 | Zhang | |
| 2016/0361994 A1 | 12/2016 | Zhang | |
| 2016/0361995 A1 | 12/2016 | Zhang | |

* cited by examiner

*Primary Examiner* — T. Bennett McKenzie
(74) *Attorney, Agent, or Firm* — Craft Chu PLLC; Andrew W. Chu

(57) ABSTRACT

The cap assembly for a carbon canister fuel tank includes an outer cap and an inner cap. There is a cavity with an opening at the inner cap, and the outer cap is above the inner cap covering the opening. There is a lower vent cap in the cavity which divides the cavity into a filling cavity and a volume cavity. There is a through hole in the center of the lower vent cap with a breathing valve which would open automatically when there is air pressure imbalance in the filling cavity and volume cavity. The first vent hole is at the bottom of the volume cavity, while the second vent hole is at the bottom of the filling cavity. The first vent hole, breathing valve and the second vent hole are arranged in sequence to constitute the exhaust channel for the vaporizing oil gas in the fuel tank.

7 Claims, 2 Drawing Sheets

CAP ASSEMBLY FOR A CARBON CANISTER FUEL TANK

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to the technical field of mechanical structure, especially to a cap assembly for carbon canister fuel tank.

2. Description of Related Art Including Information Disclosed Under 37 CFR 1.97 and 37 CFR 1.98

At present, many devices are configured with pressure relief valves to keep the air pressure balance between the inside and outside. Such as fuel tank, etc. The existing method to prevent petrol and diesel from volatilizing and overflow for the cap of the fuel tank of the petrol and diesel engines is to use carbon dust and adsorption sponge. However, the result is less than satisfactory, and a large number of volatilizing gas is directly discharged into the atmosphere which leads to air pollution. Especially when there is shaking, tilt, or even inversion of the engine while it is working, a large number of oil and gas would spill over, which seriously pollutes the air and environment, influences the wellbeing of mankind, and even has the potential safety hazards such as spontaneous combustion, etc.

BRIEF SUMMARY OF THE INVENTION

The technical challenge to be resolved by the invention is to provide a cap assembly for carbon canister fuel tank to make up the existing lack of technology mentioned above.

The technical solution for the said technical challenge provided by the present invention is as below: a cap assembly for carbon canister fuel tank, which includes an outer cap and an inner cap. There is a cavity with opening at the top configured in the stated inner cap, and the stated outer cap is above the stated inner cap covering the top opening of the stated cavity.

The said cavity has a lower vent cap, and the said lower vent cap divides the said cavity into a filling cavity and a volume cavity. The said filling cavity is on the top of the said volume cavity and is filled with adsorption filler. The said lower vent cap has a through hole in the center, and there is a breathing valve in the said through hole which could open automatically when there is air pressure imbalance in the said filling cavity and volume cavity.

There is a first vent hole at the bottom of the said volume cavity, and a second vent hole at the bottom of the said filling cavity. The said first vent hole, breathing valve and the second vent hole are arranged in sequence to constitute the exhaust channel for the vaporizing oil gas in the fuel tank.

The beneficial effects of the present invention are that: the cap assembly for carbon canister fuel tank of the present invention guarantees the air pressure balance inside the fuel tank through automatically opening the exhaust channel when there is air pressure difference between inside and outside of the fuel tank, prevents oil gas and oil from spilling over and guarantees the normal oil supply.

On the basis of the above mentioned technical solution, the following improvements have also been made by the invention:

Further improvement: there is a lower breathing layer at the bottom of the said filling cavity, and the said adsorption filler is on the top of the said lower breathing layer; there is an upper breathing layer on the top opening of the filling cavity which fully covers the said top opening of the filling cavity.

The beneficial effects of the further improvement mentioned above are that: by setting the said lower breathing layer and upper breathing layer, it may on one hand filter the oil gas entering into the said volume cavity and filling cavity, on the other hand, effectively prevent the adsorption filler in the said filling cavity from entering into the fuel tank and blocking the carburetor.

Further improvement: the bottom surface of said lower breathing layer and the top surface of the said upper breathing layer are both rough surface.

The beneficial effects of the further improvement mentioned above are that: using rough surface for the bottom surface of said lower breathing layer and the top surface of the said upper breathing layer may increase the friction force when contacting with the said adsorption filler and reduce the vibration when the vehicle jolts while driving.

Further improvement: it also includes an inner cover plate, the said inner cover plate is in between the said outer cap and the said upper breathing layer and fully covers the top opening of the filling cavity, and there is a third through hole in the inner cover plate for oil gas to go through and exhaust.

The beneficial effects of the further improvement mentioned above are that: by setting the said inner cover plate, a division is put up between the said filling cavity and outer cap, on one hand, it may enhance the strength of the said upper breathing layer, on the other hand, it may also avoid overflow of adsorption filler when the said upper breathing layer fractures.

Further improvement: it also includes a upper vent cap, the said upper vent cap is in between the said lower vent cap and the said lower breathing layer and crimps the said breathing valve to the through hole of the said lower vent, and the said lower breathing layer is above the said upper vent cap, the said second vent hole is at the corresponding position of the said breathing valve at the upper vent cap.

The beneficial effects of the further improvement mentioned above are: by using the said upper vent cap, on one hand, it may support the said lower breathing layer and increase its strength, on the other hand, it may also form a sealing connection between the said lower breathing layer and said breathing valve, prevent the oil gas for the said volume cavity from entering into the said filling cavity.

Further improvement: the top opening of the said inner cap is weld to the lower surface of the said inner cover plate; and the edge of the said lower breathing layer is weld to the said inner cap.

The beneficial effects of the further improvement mentioned above are: by the method mentioned above, firm connections have been formed between the said inner cap and the said inner cover plate, as well as between the said lower vent cap and the said upper vent cap, which can effectively prevent the filer from entering into the fuel tank, meanwhile, it can also avoid loosing of the fuel tank cap assembly due to vehicle vibration while driving.

Further improvement: there are multiple raised structures or concave structures on the surface of the said upper vent cap, and the said second vent hole is located at the area in between the said raised structures or concave structures.

The beneficial effects of the further improvement mentioned above are that: by adopting the said raised structures or concave structures, it can effectively prevent the formation of sealing connection between the said upper vent cap and the said filling cavity, then the oil gas may enter into the said filling cavity through the clearance formed between the said raised structures or concave structures and the said filling cavity.

Further improvement: the bottom of the said cavity is funnel shaped.

The beneficial effects of the further improvement mentioned above are that: by the method mentioned above, it may guarantee that in case of negative fuel tank pressure the small amount of oil residual in the volume cavity would discharge into the fuel tank through the said first vent hole as much as possible, which would reduce the oil residual in the volume cavity, increase the preservation for activated carbon and enhance the capacity of absorption, and it is more environment friendly and has less pollution.

Further improvement: there is a matching slot to the fuel tank opening in the side wall of the bottom of the said inner cap, and there is a sealing ring in the said slot, when the cap assembly for the fuel tank covers the fuel tank opening, the side wall of the said inner cap is sealed and connected to the inner wall of the fuel tank opening via the said sealing ring.

The beneficial effects of the further improvement mentioned above are: by using the said sealing ring, it can prevent the oil gas from directly discharging into the atmosphere without being filtered by the oil absorption filler in the filling cavity and polluting the environment.

Further improvement: it also includes a hanger, the amount of the said first vent hole is multiple, the said hanger is at the bottom of the said inner cap and the first vent holes are arranged around the top of the said hanger.

In the figure, each number is representative of a part, and the parts list is as below:

1. outer cap; 2. inner cover plate; 4. upper vent cap; 5. breathing valve; 6. lower vent cap; 7. inner cap; 8. sealing ring; 9. hanger; 10. adsorption filler; 31. lower breathing layer; 32. upper breathing layer.

DETAILED DESCRIPTION OF THE INVENTION

In the following part, the principles and characteristics of the present invention according to the accompanying figure are described, and all the examples made are to explain the present invention, not to limit the scope of the present invention.

Figure 1:
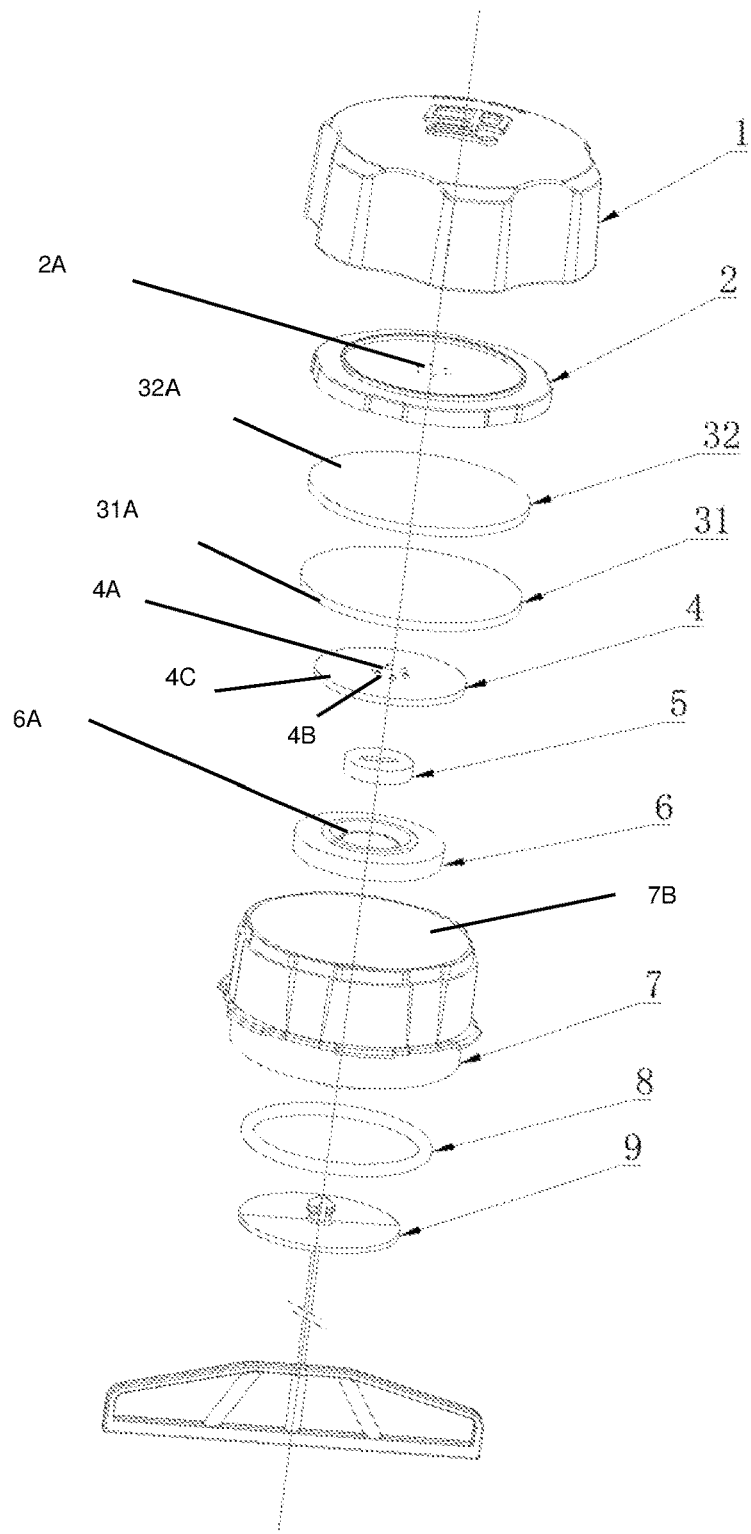
FIG. 1 is the breakdown schematic view of the cap assembly for carbon canister fuel tank of the present invention.
Figure 2:
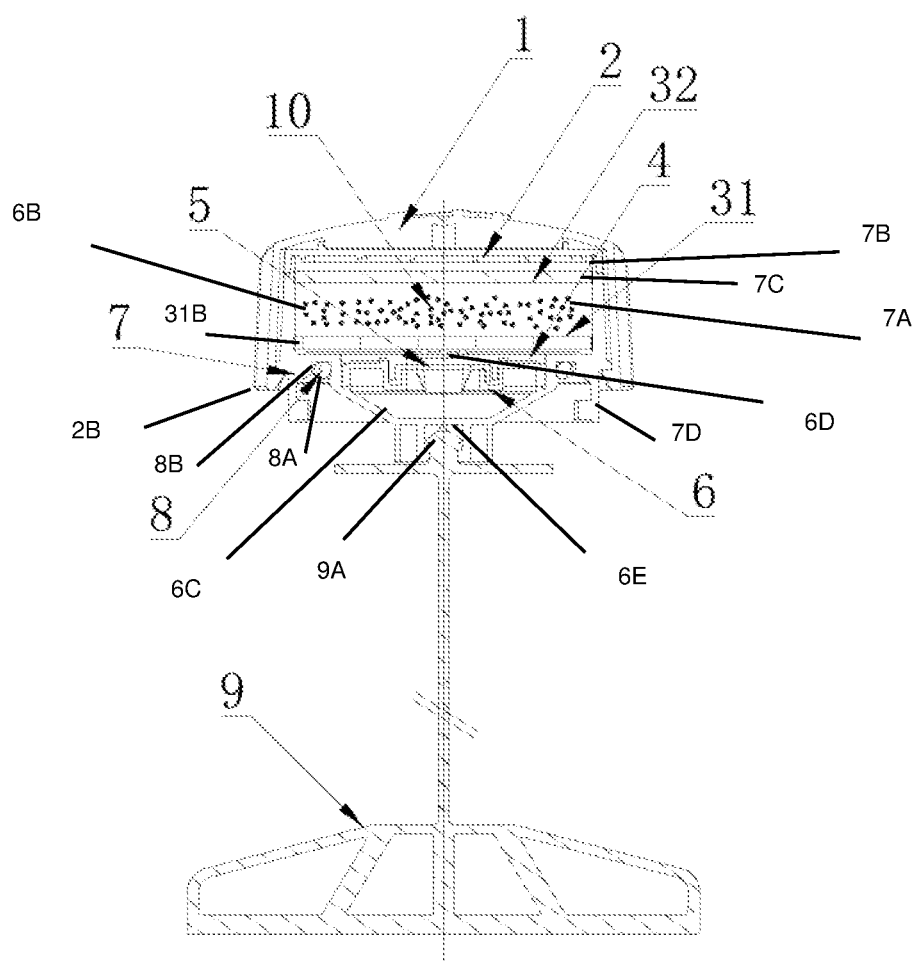
FIG. 2 is the sectional schematic view of the cap assembly for carbon canister fuel tank of the present invention.

As shown in FIG. 1, a cap assembly for carbon canister fuel tank contains an outer cap 1 and an inner cap 7, there is a cavity 7A with an opening 7B at the top 7C in the said inner cap 7, the said outer cap 1 is above the said inner cap and also covers the top opening of the said cavity.

The said cavity has a lower vent cap 6, and the said lower vent cap 6 divides the said cavity into a filling cavity 6B and a volume cavity 6C. The said filling cavity is on the top of the said volume cavity and is filled with adsorption filler 10. The said lower vent cap 6 has a through hole 6A in the center, and there is a breathing valve 5 in the said through hole which could open automatically when there is air pressure imbalance in the said filling cavity and volume cavity.

There is a first vent hole 6D at the bottom of the said volume cavity, and a second vent hole at the bottom of the said filling cavity. The said first vent hole, breathing valve 5 and the second vent hole 6E are arranged in sequence to constitute the exhaust channel for the vaporizing oil gas in the fuel tank. The amounts of the said first hole and second vent hole are both multiple, and multiple said first vent holes are evenly set on the bottom of the said volume cavity, while multiple said second vent holes are evenly set on the bottom of the said filling cavity.

The volatilizing oil gas from the fuel tank first passes through the said first vent hole, enters into the said volume cavity, goes through the said breathing valve 5, then enters into the said filling cavity through the said second vent hole, and after being absorbed and filtered by the said adsorption filler 10, the oil gas would be discharged through the said outer cap.

Preferably, the said adsorption filler 10 adopts carbon dust or activated carbon, etc.

In this implementation, there is a lower breathing layer 31 at the bottom of the said filling cavity, and the said adsorption filler 10 is on the top of the said lower breathing layer 31; there is an upper breathing layer 32 on the top opening of the filling cavity which fully covers the said top opening of the filling cavity. By setting the said lower breathing layer 31 and upper breathing layer 32, it may on one hand filter the oil gas entering into the said volume cavity and filling cavity, on the other hand, effectively prevent the adsorption filler in the said filling cavity from entering into the fuel tank and blocking the carburetor.

Preferably, the said lower breathing layer 31 and upper breathing layer 32 adopt breathing cotton.

Preferably, the bottom surface of said lower breathing layer 31 and the top surface of the said upper breathing layer 32 are both rough surface. Using rough surface for the bottom surface 31A of said lower breathing layer 31 and the top surface 32A of the said upper breathing layer 32 may increase the friction force when contacting with the said adsorption filler and reduce the vibration when the vehicle jolts while driving.

The present invention also includes an inner cover plate 2, the said inner cover plate 2 is in between the said outer cap 1 and the said upper breathing layer 32 and fully covers the top opening of the filling cavity, and there is a second through hole 2A in the inner cover plate 2 for oil gas to go through and exhaust. By setting the said inner cover plate 2, a division is put up between the said filling cavity and outer cap 1, on one hand, it may enhance the strength of the said upper breathing layer 32, on the other hand, it may also avoid overflow of adsorption filler when the said upper breathing layer 32 fractures.

The said cap assembly for carbon canister fuel tank of the invention also includes a upper vent cap 4, the said upper vent cap 4 is in between the said lower vent cap 6 and the said lower breathing layer 31, has a third through hole 4A and crimps the said breathing valve 5 to the through hole 6A of the said lower vent 6, and the said lower breathing layer 31 is above the said upper vent cap 4, the said second vent hole is at the corresponding position of the said breathing valve at the upper vent cap 4. By using the said upper vent cap 4, on one hand, it may support the said lower breathing layer 31 and increase its strength, on the other hand, it may also form a sealing connection between the said lower breathing layer 31 and said breathing valve 5, prevent the oil gas for the said volume cavity from entering into the said filling cavity.

In this implementation, the top opening of the said inner cap 7 is weld to the lower surface of the said inner cover plate 2; and the edge 31B of the said lower breathing layer 31 is weld to the said inner cap 7. By the method mentioned above, firm connections have been formed between the said inner cap 7 and the said inner cover plate 2, as well as between the said lower vent cap 6 and the said upper vent cap 4, which can effectively prevent the filer from entering into the fuel tank, meanwhile, it can also avoid loosening of the fuel tank cap assembly due to vehicle vibration while driving.

Preferably, there are multiple raised structures 4B or concave structures on the surface 4C of the said upper vent cap 4, and the said second vent hole is located at the area in between the said raised structures or concave structures. By adopting the said raised structures or concave structures, it can effectively prevent the formation of sealing connection between the said upper vent cap 4 and the said filling cavity, then the oil gas may enter into the said filling cavity through the clearance formed between the said raised structures or concave structures and the said filling cavity.

Preferably, there are also multiple raised structures or concave structures at the edge of the lower surface of the lower vent cap 6, and the said through hole is in the center of the said lower vent cap 6. By adopting the said raised structures or concave structures, it can effectively prevent the formation of sealing connection between the said upper vent cap 6 and the said volume cavity, then the oil gas may enter into the said volume cavity through the clearance formed between the said raised structures or concave structures and the said volume cavity.

Preferably, the bottom of the said cavity is funnel shaped. By the method mentioned above, it may guarantee that in case of negative fuel tank pressure the small amount of oil residual in the volume cavity would discharge into the fuel tank through the said first vent hole as much as possible, which would reduce the oil residual in the volume cavity, increase the preservation for activated carbon and enhance the capacity of absorption, and it is more environment friendly and has less pollution.

In this implementation, there is a matching slot 8A to the fuel tank opening in the side wall 8B of the bottom 7D of the said inner cap 7, and there is a sealing ring 8 in the said slot. When the cap assembly for the fuel tank covers the fuel tank opening, the side wall of the said inner cap 7 is sealed and connected to the inner wall of the fuel tank opening via the said sealing ring 8. By using the said sealing ring 8, it can prevent the oil gas from directly discharging into the atmosphere without being filtered by the oil absorption filler 10 in the filling cavity and polluting the environment.

Preferably, the said cap assembly for carbon canister fuel tank of the invention also includes a hanger 9, the amount of the said first vent hole is multiple, the said hanger 9 is at the bottom 7D of the said inner cap 7 and the first vent holes are arranged around the top 9A of the said hanger 9.

The cap assembly for carbon canister fuel tank of the present invention guarantees the air pressure balance inside the fuel tank through automatically opening the exhaust channel when there is air pressure difference between inside and outside of the fuel tank, prevents oil gas and oil from spilling over and guarantees the normal oil supply.

The above descriptions are only preferable implementations of the present invention, which are not used to limit the invention, and any alteration, equivalent replacement, improvement and so on within the concept and principles of the present invention should be included in the protection extent of the invention.

I claim:

1. A cap assembly for a carbon canister fuel tank, comprising:
   an outer cap; and
   an inner cap having a cavity with an opening at a top of said inner cap, said outer cap being above said inner cap and covering said opening of said cavity;
   a lower vent cap within said cavity so as to divide said cavity into a filling cavity and a volume cavity,
   wherein said filling cavity is on top of said volume cavity and is filled with an adsorption filler, and
   wherein said lower vent cap has a first through hole in a center thereof;
   a breathing valve in said first through hole so as to open automatically when there is air pressure imbalance between said filling cavity and said volume cavity,
   wherein said volume cavity has a first vent hole at a bottom of said volume cavity,
   wherein said filling cavity has a second vent hole at a bottom of said filling cavity, and
   wherein said first vent hole, said breathing valve and said second vent hole—are arranged in sequence so as to form an exhaust channel for vaporizing oil gas;
   a lower breathing layer at a bottom of said filling cavity;
   an upper breathing layer at a top of said filling cavity and covering said opening of said cavity,
   wherein said adsorption filler is on top of said lower breathing layer and between said lower breathing layer and said upper breathing layer;
   an inner cover plate in between said outer cap and said upper breathing layer, covering said opening of said cavity;
   a second through hole in said inner cover plate so as to pass and exhaust oil gas; and
   an upper vent cap being in between said lower vent cap and said lower breathing layer, having a third through hole, and crimping said breathing valve to said first through hole of said lower vent cap, said lower breathing layer being above said upper vent cap, said second vent hole having a position corresponding to said breathing valve when crimped by said upper vent cap.

2. The cap assembly for the carbon canister fuel tank, according to claim 1, wherein a lower surface of said lower breathing layer and an upper surface of said upper breathing layer are roughened surfaces.

3. The cap assembly for the carbon canister fuel tank, according to claim 1, wherein said opening of said inner cap is welded to a lower surface of said inner cover plate, and wherein said lower breathing layer has an edge welded to—said inner cap.

4. The cap assembly for the carbon canister fuel tank, according to claim 1, further comprising:
   a plurality of structures on a top surface of said upper vent cap, and wherein said second vent hole is located between said structures.

5. The cap assembly for the carbon canister fuel tank, according to claim 1, wherein a bottom of said cavity is funnel shaped.

6. The cap assembly for the carbon canister fuel tank, according to claim 1, further comprising:
   a matching slot in a side wall of a bottom of said inner cap so as to engage a fuel tank; and
   a sealing ring in said matching slot so as to seal said side wall to said fuel tank.

7. The cap assembly for the carbon canister fuel tank, according to claim 1, further comprising:
   a hanger corresponding to said first vent hole and being at said bottom of said inner cap, wherein said first vent hole is comprised of a plurality of vent holes arranged around a top of said hanger.

* * * * *